Nov. 9, 1937.  I. M. STEIN  2,098,650
TEMPERATURE MEASURING SYSTEM
Filed Nov. 27, 1935
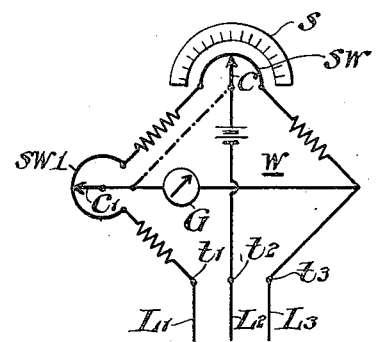
Fig.1.
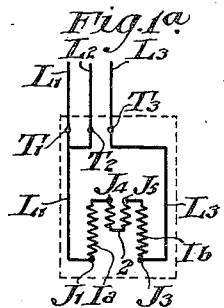
Fig.1a.
Fig.1b.
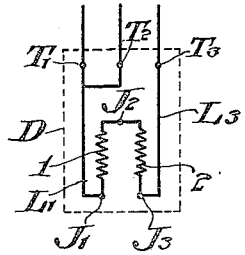
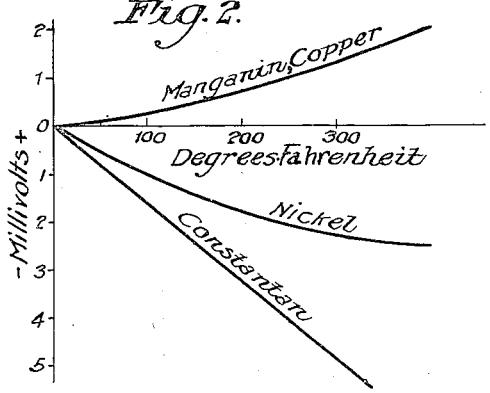
Fig.2.
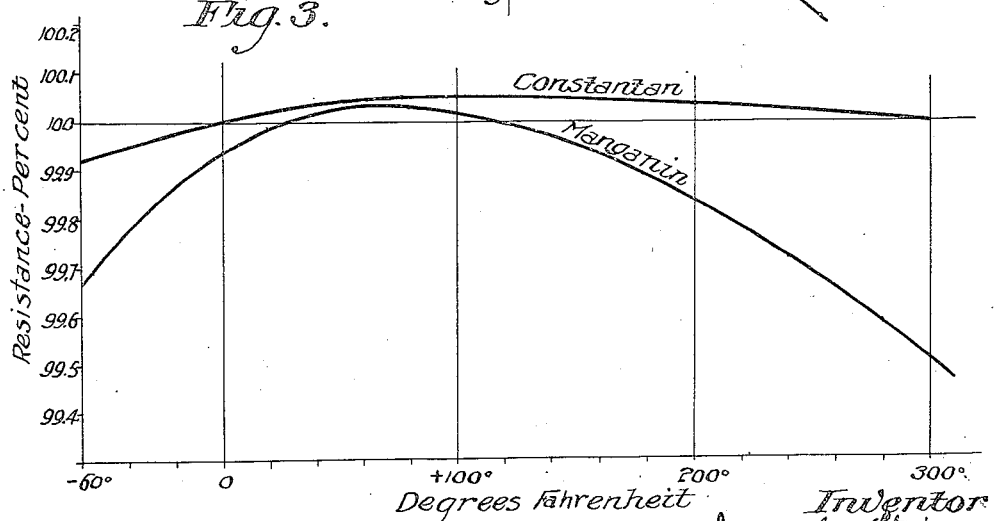
Fig.3.
Inventor
Irving M. Stein
By Cornelius D. Ehret
Attorney Patented Nov. 9, 1937

2,098,650

UNITED STATES PATENT OFFICE 2,098,650

TEMPERATURE MEASURING SYSTEM

Irving M. Stein, Philadelphia, Pa., assignor to Leeds & Northrup Company, Philadelphia, Pa., a corporation of Pennsylvania Application November 27, 1935, Serial No. 51,822

9 Claims. (Cl. 73—32)

My invention relates to temperature measuring systems which utilize the property of an electrical conductor to change in resistance with variation of temperature.

In resistance thermometry, it has been the practice to make the detector, or temperature-responsive element, of a conductor, such as nickel, having a substantial positive coefficient of resistance, and a standardizing conductor, such as manganin, having a low temperature-resistance coefficient included in series therewith, the size or resistance of the standardizing conductor chosen or adjusted to obtain a standard temperature resistance coefficient of the detector. As a result of metallurgical advances, the temperature-resistance coefficient of substantially the only nickel now commercially available is materially enhanced, with the result that a substantially greater percentage of manganin must be used to obtain the standard temperature coefficient; and since the resistance-temperature coefficient of manganin is not negligible, the increased size of the standardizing conductor introduces errors of substantial magnitude particularly in the measurement of temperatures which vary through a wide range.

In accordance with one aspect of my invention, the standardizing conductor or coil is made of constantan, which has a negligible coefficient of resistance throughout the range of temperatures for which resistance thermometers are used.

In accordance with a further aspect of my invention the effect of thermo-electric voltages developed within the thermometer resistance or bulb is minimized by dividing one of the conductors, generally the one of high temperature coefficient, such as nickel or equivalent, into components between which is connected the standardizing conductor, such as constantan or equivalent. This mode of connection is effective to reduce the measurement errors due to thermo-electric effects regardless of whether the standardizing conductor be of manganin, constantan or other material which with the nickel or equivalent produces a substantial thermo-electric effect.

My invention further resides in the features of construction, combination and arrangement hereinafter described and claimed:

For an understanding of my invention, reference is to be had to the accompanying drawing in which:

Fig. 1 diagrammatically illustrates a resistance-thermometer system;

Fig. 1a illustrates diagrammatically a resistance-thermometer detector;

Fig. 1b illustrates diagrammatically a modification of Fig. 1a;

Figs. 2 and 3 are characteristic curves referred to in explanation of the invention.

The scales and charts of indicating or recording resistance thermometers widely used for industrial and laboratory measurements of temperature and utilizing the property of nickel wire to change in resistivity with temperature, are based upon a standard temperature coefficient of resistance of the resistance-thermometer detector. The standard calibration curves, established when the available nickel was relatively impure, are based upon a temperature coefficient of approximately 0.4% per degree centigrade. Each detector previously included, in series with the nickel coil, a standardizing coil of manganin which was adjusted to obtain the standard coefficient. Substantially the only nickel wire now commercially available has, due to improved purity, a temperature coefficient of resistance which is very closely 0.6% per degree centigrade. While the improved purity is of advantage from the standpoint of stability, it requires that from about one-fourth to one-third of the total resistance of the detector be that of the standardizing coil. The use of such a large proportion of manganin introduces measurement errors of substantial magnitude within the range of from about −60° F. to about 300° F. because the temperature-coefficient of resistance of manganin is not negligible over this range.

Referring to Fig. 1, the network W is essentially a Wheatstone bridge including the detector D in one arm thereof. Specifically, it may be, as shown, a resistance thermometer of the type shown in Leeds Patent 1,097,651 and is balanced at the existing temperature by simultaneously adjusting the slidewire contacts C and C1 until there is no deflection of galvanometer G. The balancing may be performed automatically by any suitable mechanism, such, for example, of the type shown in Squibb Patent 1,935,732. The temperature is readable from the indicator scale or recorder chart S which is based upon the standard temperature coefficient of approximately 0.4% per degree centigrade.

The leads L1, L2, L3 extend from the terminals t1, t2, t3 of the network W to the terminals T1, T2, T3 of the detector D which may be located at a more or less remote point. The detector D comprises the conductor or coil I of nickel wire, whose resistance varies substantially with the temperature under measurement, and the standardizing conductor or coil 2. The nickel coil 1 is connected to the conductor L1, usually of copper, at junction J1 and to the standardizing coil 2 at junction J2. The other end of the standardizing coil 2 is connected to the lead L3, usually of copper, at junction J3.

The essential elements of detector D are the coils 1 and 2; it is, of course, necessary in use of the detector to employ leads such as L1, L2 and L3 to connect the detector coils to the measuring network. Whether or not these leads, or any parts of them, are permanently connected to coils 1 and 2, and thus, in a loose sense, be considered as part of the detector, is immaterial.

As stated above, the temperature coefficient of resistance of substantially the only nickel now commercially available is so high that when the standardizing coil 2 is of manganin wire it is a source of substantial errors of measurement.

By making the standardizing coil 2 of constantan instead of manganin, the error due to change in resistance of the standardizing coil with temperature is negligible, the maximum error throughout the range of from about −60° F. to about 300° F. being about and never substantially greater than 0.02%. As appears from Fig. 3, the maximum percentage resistance change of constantan for this wide range of temperature is about 0.06%, but since the resistance of the standardizing coil 2 is not greater than one-third of the total resistance of the detector, the maximum error due to the temperature coefficient of resistance of the constantan standardizing coil is not greater than 0.02%. However, mere substitution of constantan instead of manganin is not satisfactory, if precise measurements are desired, because of the magnitude of the resultant of the thermo-electric voltages generated at the junctions J1, J2 and J3.

The measurement error due to the thermoelectric forces within the detector can be reduced to a negligible value, not greater than about 0.02% by constructing the detector as diagrammatically shown in Fig. 1a, in which the nickel coil 1 is divided into two sections 1a, 1b, each connected at one terminal to one or the other of the copper leads L1, L3 and whose other terminals are connected at J4, J5 to the terminals of the standardizing coil 2. The thermo-electric voltage generated at the copper-nickel junction J1 is substantially equal and opposite to the thermo-electric voltage generated at the nickel-copper junction J3; and the thermo-electric voltage generated at the nickel-constantan junction J4 is substantially equal and opposite to the thermoelectric voltage generated at the constantan-nickel junction J5. Though the same type balancing effect may be obtained by dividing the standardizing coil and including the nickel coil 1c between the divided sections 2a, 2b, as in Fig. 1b, the arrangement shown in Fig. 1a is preferred because the thermo-electric voltage of a copper-constantan junction, as may be seen from the curves of Fig. 2 is substantially higher than the thermo-electric voltage of a copper-nickel couple or junction. Therefore in the absence of perfect balance, the resultant thermo-electromotive force is less when the nickel coil is divided. Otherwise expressed, it is desirable that the leads L1, L2, usually of copper, should be connected to the nickel coil instead of to the constantan coil since the thermo-electric power of nickel is nearer the thermo-electric power of copper than is the thermo-electric power of constantan.

The maximum total error due to the temperature coefficient of constantan and to internal thermo-electric voltages is, for the mode of arranging the junctions shown in Fig. 1a, only about .04%, affording an accuracy of better than 0.25° F.

The arrangements shown in Figs. 1a and 1b are also suited to reduce the resultant of the thermo-electric forces of a detector using a standardizing coil of manganin or other low temperature coefficient metal, and so reduce the measurement errors due to that cause. For the nickel-manganin detector, it is preferable to split the standardizing or manganin coil (Fig. 1b) rather than the nickel coil because there is practically no voltage generated by a manganin copper junction, as apparent from Fig. 2 since they have the same thermo-electric power. This mode of connection does not, of course, reduce the error due to the change of the temperature coefficient of resistance of the manganin or other standardizing wire which, as shown for manganin in Fig. 3, rapidly increases as the limits of the range −60° F. to 300° F. are approached. Therefore the arrangement shown in Fig. 1a using a standardizing coil of constantan and a divided coil of nickel is, particularly for measurements over a wide range of temperatures, preferred; however, for some aspects of my invention the other arrangements described may be employed.

With either modification Fig. 1a or Fig. 1b, the corresponding pairs of junctions of dissimilar metals should be located to have a minimum difference of temperature between them; that is, in Fig. 1a, junctions J1, J3 should be located to be at substantially the same temperature and junctions J4 and J5 should be located to be at substantially the same temperature.

To facilitate the method of connection shown in Fig. 1a, the starting loop of the nickel coil, which is preferably wound bifilar, is left protruding slightly beyond the end of a form or spool. After the coil has been calibrated, the loop is cut and a coil of constantan, preferably bifilar wound, is connected to the terminals formed by cutting of the loop. The detector element thus formed may be mounted and used in any usual or known manner.

The detector coils need not be wound in solenoid form; they may be formed by any more or less compact arrangement of the proper length of resistance conductor; for example, either or both coils may be in the form of a woven, flat webbing, for example as disclosed in Tarpley Patent No. 1,972,499, or Tarpley et al. Patent 1,972,720.

What I claim is:

1. A detector for a resistance thermometer comprising a conductor having a substantial positive temperature coefficient of resistance and which is conductive at ordinary temperatures and a standardizing conductor having a low temperature coefficient of resistance and the ratio of whose resistance to the total resistance of the detector is such that said detector has a standard temperature coefficient of resistance, one of said conductors divided into components between which the other conductor is connected.

2. A detector for a resistance thermometer comprising a conductor having a substantial temperature coefficient of resistance, and a standardizing conductor having a low temperature coefficient of resistance, said conductors having different thermo-electric powers, and leads of a third kind of metal extending to one of said conductors of said detector, the conductor which has the thermo-electric power nearer to that of the lead metal being divided and having one pair of terminals connected to said leads and its other pair of terminals connected to said other conductor.

3. A detector for a resistance thermometer comprising a divided coil of nickel wire, and a standardizing coil of constantan connected between terminals of different sections of the divided coil, and copper leads connected to the other terminals of the divided coil.

4. A detector for a resistance thermometer comprising a divided conductor having a substantial temperature coefficient of resistance, and a standardizing conductor having a low temperature coefficient of resistance connected between divided portions of said first conductor.

5. A detector for a resistance thermometer comprising a divided standardizing manganin wire, and a nickel wire connected between divided portions of said first wire.

6. A detector for a resistance thermometer comprising a divided nickel wire, and a standardizing constantan wire connected between divided portions of said first wire.

7. A resistance thermometer detector having a maximum variation from a standard temperature coefficient of resistance not substantially greater than .02 per cent. within the range of from about —60 degrees F. to about 300 degrees F. comprising a conductor of nickel, and a standardizing conductor of constantan whose resistance is not greater than one-third of the combined resistance of said conductors.

8. A resistance thermometer detector having a maximum variation from a standard temperature coefficient of resistance not substantially greater than .02 per cent. within the range of from about —60 degrees F. to about 300 degrees F. comprising a coil of conductor having a substantial temperature coefficient of resistance, a standardizing coil whose resistance is not greater than one-third of the combined resistance of said coils, said coils being of metals having different thermo-electric powers, and leads from the detector, the coil whose conductor has the thermo-electric power nearer to that of the lead metal being divided and having one pair of terminals connected to said leads and its other pair of terminals connected to said other coil to reduce the error due to thermal electro-motive force to a maximum not substantially greater than .02 per cent.

9. A resistance thermometer detector having a maximum variation from a standard temperature coefficient of resistance not substantially greater than 0.02 per cent. within the range of from about —60 degrees F. to 300 degrees F. comprising a divided coil of nickel wire, and a standardizing coil of conductor having a low temperature coefficient of resistance and whose resistance is not greater than one-third of the combined resistance of said coils, said standardizing coil being connected between sections of the nickel coil to reduce the error due to thermal electromotive force to a maximum not substantially greater than 0.02 per cent.

IRVING M. STEIN.